(12) United States Patent
Ichikawa et al.

(10) Patent No.: US 6,773,163 B2
(45) Date of Patent: Aug. 10, 2004

(54) ZIPPERED BAG AND A METHOD FOR MANUFACTURING SAME

(75) Inventors: Tooru Ichikawa, Tokyo-to (JP); Kou Go, Tokyo-to (JP)

(73) Assignee: Hosokawa Yoko Co., Ltd. (JP)

( * ) Notice: Subject to any disclaimer, the term of this patent is extended or adjusted under 35 U.S.C. 154(b) by 0 days.

(21) Appl. No.: 10/199,322

(22) Filed: Jul. 22, 2002

(65) Prior Publication Data

US 2003/0016889 A1 Jan. 23, 2003

(30) Foreign Application Priority Data

Jul. 23, 2001 (JP) .................................... P2001-221935

(51) Int. Cl.$^7$ ............................................. B65D 33/16
(52) U.S. Cl. .................... 383/204; 383/61.2; 383/37; 383/104; 383/34; 383/63; 24/DIG. 50; 24/585.12
(58) Field of Search ............................... 383/61.1–61.3, 383/200, 203, 204, 104, 63, 906, 68, 34, 34.1; 24/DIG. 50, 585.12

(56) References Cited

U.S. PATENT DOCUMENTS

| | | | |
|---|---|---|---|
| 3,397,835 A | * | 8/1968 | Henning ...................... 383/208 |
| 3,640,381 A | * | 2/1972 | Kanada et al. ............... 229/206 |
| 3,815,810 A | * | 6/1974 | Wellman ...................... 383/204 |
| 4,027,819 A | * | 6/1977 | Herrera-Gutierrez ........ 383/204 |
| 4,998,646 A | * | 3/1991 | Sherman ...................... 222/107 |
| 6,007,246 A | | 12/1999 | Kinigakis et al. |
| 6,206,571 B1 | | 3/2001 | Olin |
| 6,361,212 B1 | * | 3/2002 | Sprehe et al. ................. 383/63 |

FOREIGN PATENT DOCUMENTS

| | | |
|---|---|---|
| DE | 78 29 228 U1 | 1/1979 |
| EP | 1 132 312 A2 | 9/2001 |
| GB | 2 341 591 A | 3/2000 |
| WO | WO 01/64542 A2 | 9/2001 |

* cited by examiner

*Primary Examiner*—Robin A. Hylton
(74) *Attorney, Agent, or Firm*—Parkhurst & Wendel, L.L.P.

(57) ABSTRACT

A zippered bag comprises a main bag body having first and second opposing face members, a top, a bottom, and first and second opposing sides; and a zipper disposed on the main bag body. The zipper extends from the top to one of the first and second opposing sides so as to be oblique relative to the top. The zipper may comprise a male track and a female track engageable therewith. The male track and the female track may be formed by an injection molding. Each of the male track and the female track may comprise a main portion and end portions provided on opposite ends of the main portion, each of the end portions having a smaller height than that of the main portion.

The main bag body may have a sealed zone, which is placed on the outer side of the zipper and has an opening guide portion, which is provided in parallel with the zipper so that the sealed zone is to be easily torn open along the opening guide portion.

5 Claims, 10 Drawing Sheets

ZIPPERED BAG AND A METHOD FOR MANUFACTURING SAME

BACKGROUND OF THE INVENTION

1. Field of the Invention

The present invention relates to a zippered bag having a zipper by which a mouth portion to be formed can be opened or closed, and a method for manufacturing such a zippered bag.

2. Description of the Related Art

There have conventionally been known a self-standable pouch or a flat bag with a zipper by which a mouth portion to be formed could be opened or closed. The zipper provided on such a bag is composed of a male track and a female track engageable therewith. The male track and the female track are formed on the inner surfaces of a pair of opposing face members of a main bag body, respectively, so as to face each other and extend in the lateral direction of the main bag body. The zipper substantially extends over the main bag body in the lateral direction so that an opening operation of the zipper causes the main bag body to be opened over the entire region in the lateral direction thereof.

When the bag with the zipper opened is inclined and shaken lightly to hit softly the mouth portion of the bag against the rim of a vessel such as a cup, in order to pour the powdery or granular contents, with which the bag is filled, directly into the vessel, the contents may suddenly be spilled out in an unexpectedly large amount, thus causing inconvenient problems in handling.

In addition, the full length of the zipper is so long to substantially extend over the main bag body in the lateral direction, thus increasing the probability of occurrence of clogging of the female track with the contents. Especially in case where the bag is filed with the fine granular contents, the probability of occurrence of clogging may remarkably increase. The occurrence of clogging of the female track with the contents may make it impossible to keep the zipper in a completely closed state, thus deteriorating a function of maintaining quality of the contents in an appropriate manner.

SUMMARY OF THE INVENTION

An object of the present invention, which was made in order to solve the above-described problems, is therefore to provide a zippered bag, which has an excellent handling property facilitating a pouring operation of the bag, and prevents occurrence of clogging of the zipper, as well as a method for manufacturing such a zippered bag.

In order to attain the aforementioned object, a zippered bag of the first aspect of the present invention comprises:

a main bag body having first and second opposing face members, a top, a bottom, and first and second opposing sides; and a zipper disposed on said main bag body, wherein:

said zipper extends from one of said top and said bottom to one of said first and second opposing sides so as to be oblique relative to said one of said top and said bottom.

According to the above-mentioned features of the first aspect of the present invention, it is possible to form a mouth portion at a corner of the main bag body, thus decreasing the size of the mouth portion. As a result, there can be provided the zippered bag, which permits to facilitate the pouring operation of the bag filled with the powdery or granular contents, without suddenly spilling the contents.

In addition, decrease in size of the mouth portion leads to decrease in length of the zipper. It is therefore possible to reduce the probability of occurrence of clogging of the zipper, even when the bag is filled with fine powdery or granular material. Even if the clogging of the female track occurs, the material with which the zipper is clogged can easily be removed therefrom.

In the second aspect of the present invention, said zipper may comprise a male track and a female track engageable therewith. According to the feature of the second aspect of the present invention, the structure of the zipper becomes simple and reliable functions thereof can be ensured.

In the third aspect of the present invention, said male track and said female track may be formed on inner surfaces of said first and second opposing face members by an injection molding, respectively. According to the above-mentioned feature of the third aspect of the present invention, formation of the male track and the female track can be facilitated.

In the fourth aspect of the present invention, each of said male track and said female track may comprise a main portion and end portions provided on opposite ends of said main portion in a longitudinal direction thereof, each of said end portions having a smaller height than that of said main portion. According to the above-mentioned feature of the fourth aspect of the present invention, it is possible to reduce the probability that a gap may be formed between heat-sealed portions of the main body and the longitudinal edge of the zipper.

In the fifth aspect of the present invention, said main bag body may have a sealed zone, which is placed on an outer side of said zipper, said sealed zone having opening guide portions, which are provided in parallel with said zipper so that said sealed zone is to be easily torn open along said opening guide portions. According to the above-mentioned feature of the fifth aspect of the present invention, the sealed zone can easily be torn open along the opening guide portions and the mouth portion completely formed in the bag along the straight line can be obtained. In addition, the opening guide portions may serve as a reinforcement member for the mouth portion of the bag.

In order to attain the aforementioned object, a method of the sixth aspect of the present invention for manufacturing a zippered bag comprises the steps of:

folding a sheet of film to provide first and second opposing face members, said first and second opposing face members having a folded bottom edge, first and second opposing side edges and opposing top edges;

folding upper portions of said first and second opposing face members outward along reference lines, which respectively extend on said first and second opposing face members in parallel with said opposing top edges so as to be apart therefrom by a prescribed distance, to provide first and second folded portions with their inner surfaces exposed;

heat-sealing said first and second opposing side edges together except said first and second folded portions;

subjecting said first and second folded portions to an injection molding to form a male track on the inner surface exposed of one of said first and second folded portions and a female track on the inner surface exposed of an other of said first and second folded portions, said male track and said female track being placed along straight lines, which extend from respective side edges of said first and second folded portions to respective top edges thereof, said male track and said female track being engageable with each other to constitute a zipper;

unfolding said first and second folded portions to bring the opposing side edges of the one of said first and second folded portions into contact with the opposing side edges of the other thereof to convert said first and second folded portions into first and second unfolded portions and engage said male track with said female track to keeping said zipper in a closed state so as to be oblique relative to said opposing top edges, thus providing upper and lower engaging points of the zipper;

heat-sealing the opposing side edges of one of said first and second unfolded portions to the opposing side edges of an other thereof, respectively, to form a first upper-side heat-sealed portion including said lower engaging point and a second upper-side heat-sealed portion; and heat-sealing the top edges of said first and second unfolded portions together in a region from said upper engaging point to an upper end of said first upper-side heat-sealed portion, thus forming a non-sealed opening portion in a region from said upper engaging point to un upper end of said second upper-side heat-sealed portion.

According to the above-mentioned features of the sixth aspect of the present invention, it is possible to form a mouth portion at a corner of the main bag body, thus decreasing the size of the mouth portion. As a result, there can be provided the zippered bag, which permits to facilitate the pouring operation of the bag filled with the powdery or granular contents, without suddenly spilling the contents. In addition, decrease in size of the mouth portion leads to decrease in length of the zipper. It is therefore possible to reduce the probability of occurrence of clogging of the zipper, even when the bag is filled with fine powdery or granular material. Even if the clogging of the female track occurs, the material with which the zipper is clogged can easily be removed therefrom. Application of the injection molding facilitates formation of the zipper, which extends from the top of the main bag body to the side thereof so as to be oblique relative to the top of the main bag body. The zippered bag as manufactured has the non-sealed portion at the top of the bag, thus making it possible to fill the bag with the contents through the non-sealed portion.

In order to attain the aforementioned object, a method of the seventh aspect of the present invention for manufacturing a zippered bag comprises the steps of:

continuously providing an elongated linear zipper on an inner surface of a strip of film, while traveling said strip of film in a longitudinal direction thereof, to prepare a film-material strip with the elongated linear zipper;

determining areas, each of which has a top, a bottom and opposing sides, of the film-material strip to which a heat-sealing step is to be applied, so that said elongated linear zipper extends from said top to one of said opposing sides so as to be oblique relative to said top;

subjecting said areas of the film-material strip to said heat-sealing step; and cutting said film-material strip into a plurality of zippered bags.

According to the above-mentioned features of the seventh aspect of the present invention, it is possible to manufacture the zippered bag utilizing the linear zipper, which has previously been formed through an extrusion molding, even with the use of the other molding method than the injection molding. As a result, it is not necessary to provide a manufacturing line for the zippered bag with the injection molding machine, thus making it possible to simplify the manufacturing process.

DETAILED DESCRIPTION OF THE PREFERRED EMBODIMENTS

Now, embodiments of a zippered bag of the present invention will be described in detail below with reference to the accompanying drawings.

Figure 1:
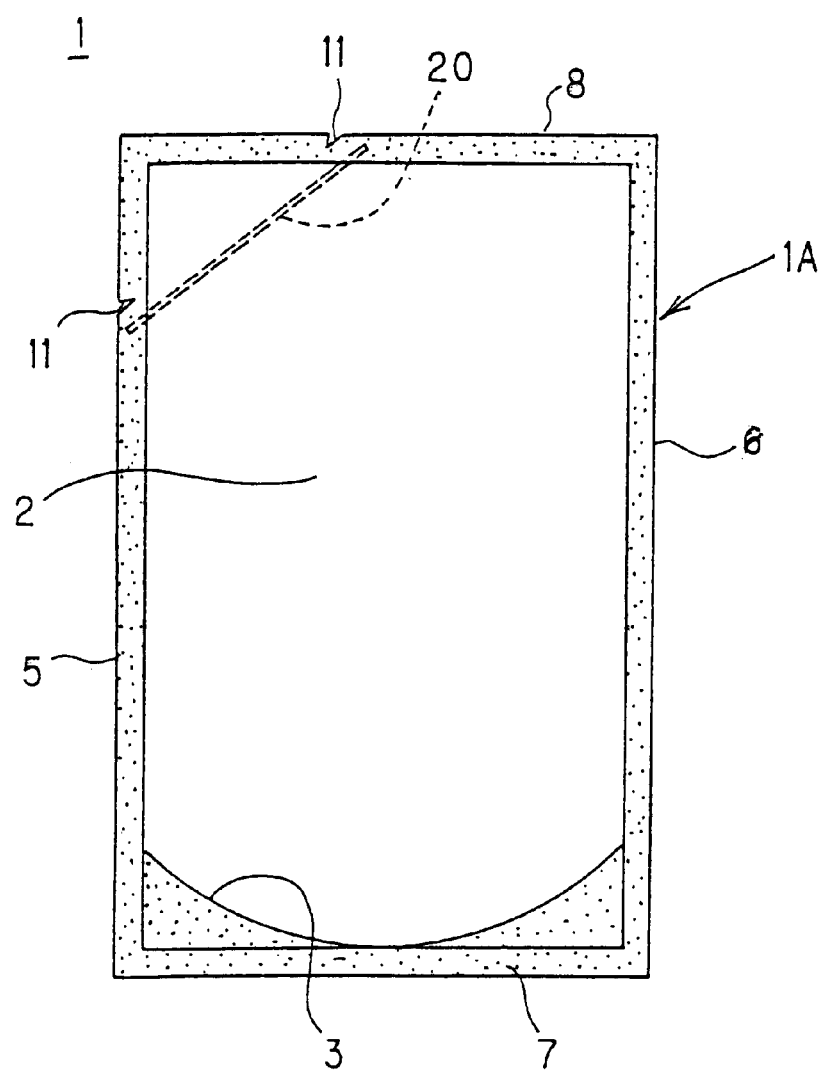
FIG. 1 is a front view illustrating a zippered bag of an embodiment of the present invention.
Figure 2:
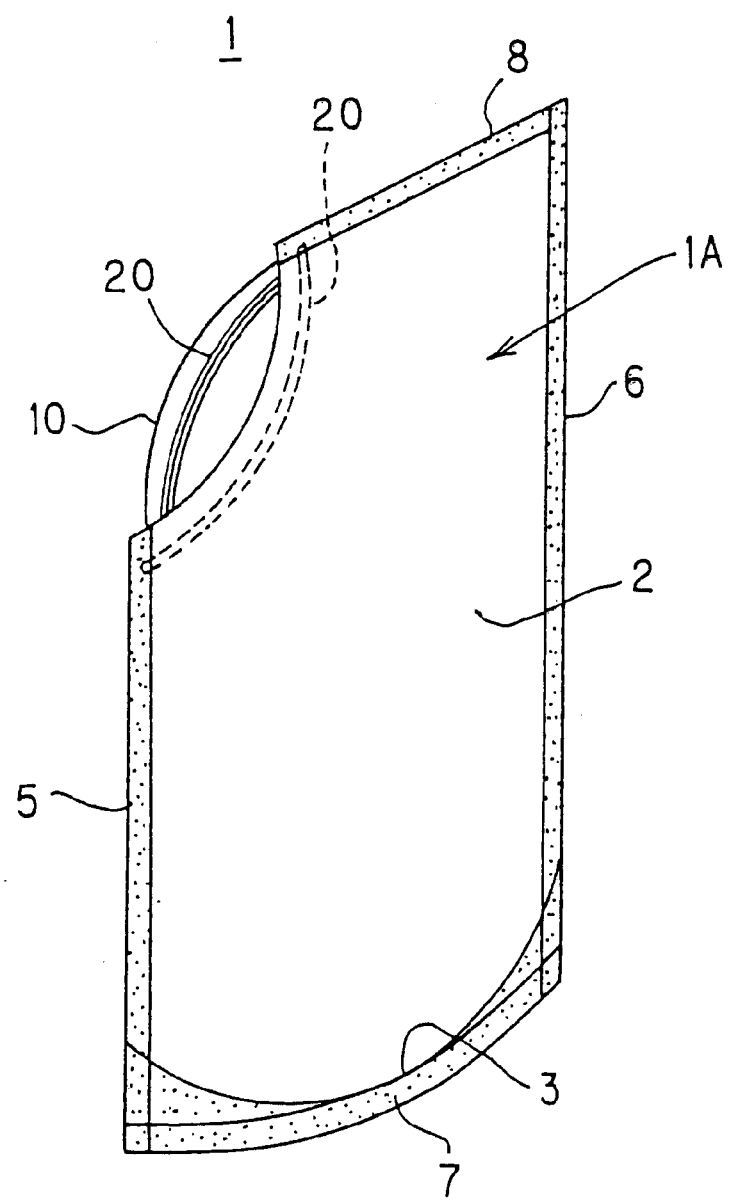
FIG. 2 is a perspective view illustrating the zippered bag as shown in FIG. 1, with the mouth portion opened.

FIG. 1 is a front view illustrating the zippered bag of the embodiment of the present invention and FIG. 2 is a perspective view illustrating the zippered bag as shown in FIG. 1, with the mouth portion 10 opened. The zippered bag is manufactured in the form of self-standable pouch 1, which is composed of a pair of opposing face members 2, 2 and a curved bottom 3. The opposing side edges 5, 6 and the top edge 8 of the one face member 2 are heat-sealed to the corresponding side edges 5, 6 and the corresponding top edge 8 of the other face member 3, respectively. The curved bottom 3 is inserted into the lower opening of the bag body so that the convex side of the curved bottom 3 faces downward. The curved bottom 3 is heat-sealed at its periphery to the lower inner surfaces of the face members 2, 2. A main bag body 1A is prepared in this manner.

The self-standable pouch 1 is provided on its upper side with a zipper 20. The zipper 20, which is formed on the inner surfaces of the face members 2, 2, permits to open or close a mouth portion 10, which is to be formed by tearing a triangular sealed zone. The zipper 20 extends linearly from the left-hand side of the main bag body 1A to the top thereof so as to be oblique to the top thereof. The mouth portion 10 of the self-standable pouch 1 is located at the upper and left-hand corner portion of the main bag body 1A, in the vicinity of which the zipper 20 is formed. The top edge 8 and the left-hand side edge 5 of the main bag body 1A are provided with notches 11, 11, respectively, which are located outside the zipper 20 in the vicinity thereof. The notches 11, 11 serve as an opening facilitation member from which the triangular sealed zone of the main bag body 1A can be torn open so as to form the mouth portion 10 of the self-standable pouch 1. The mouth portion 10 can be easily be formed by tearing the triangular sealed zone of the main bag body 1A from one of the notches 11, 11 along the zipper 20.

With respect to material of which the face members 2, 2 and the bottom 3 forming the self-standable pouch 1, there may be used a sheet of resin such as polyester, nylon, polypropylene and polyethylene, or a laminate of at least two sheets of such resin.

In case where the transparent self-standable pouch 1 is formed of a laminate, the laminate may have the layer structure of (a) (1) a biaxial oriented polyester (PET) or biaxial oriented nylon layer, (2) a printing layer, (3) a dry laminate (DL) adhesive layer and (4) a non-oriented polypropylene (CCP) layer or (b) (1) a biaxial oriented polyester (PET) or biaxial oriented nylon layer, (2) a printing layer, (3) a dry laminate (DL) adhesive layer and (4) a straight chain-low density polyethylene (L-LDPE) layer.

In case where the opaque self-standable pouch 1 is formed of a laminate including an aluminum foil layer, the laminate may have the layer structure of (a) (1) a biaxial oriented polyester (PET) or biaxial oriented nylon layer, (2) a printing layer, (3) a dry laminate (DL) adhesive layer, (4) an aluminum (AL) layer, (5) a dry laminate (DL) adhesive layer and (6) a non-oriented polypropylene (CCP) layer or (b) (1) a biaxial oriented polyester (PET) or biaxial oriented nylon layer, (2) a printing layer, (3) a dry laminate (DL) adhesive layer, (4) an aluminum (AL) layer, (5) a dry laminate (DL) adhesive layer and (6) a straight chain-low density polyethylene (L-LDPE) layer.

Figure 3:
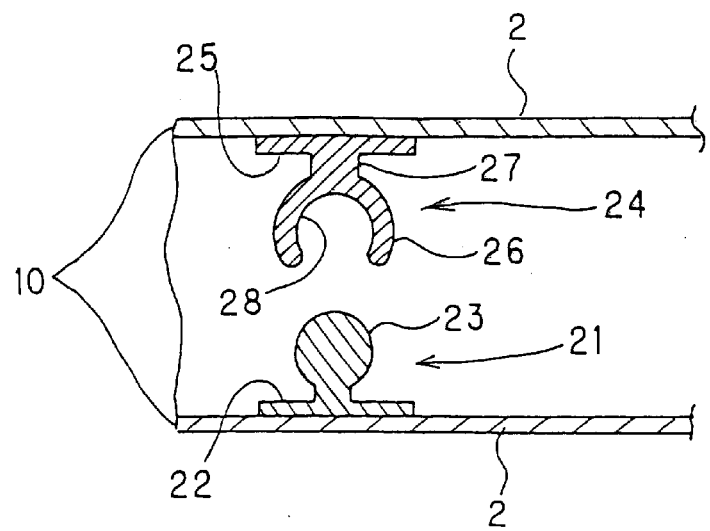
FIG. 3 is a cross-sectional view of a zipper provided in the zippered bag as shown in FIG. 1.

The zipper 20 formed in the vicinity of the mouth portion 10 of the bag is composed of a male track 21 and a female track 24 engageable therewith, as shown in FIG. 3. The male track 21 has an elongated base 22 secured on the inner surface of the face member 2 and an elongated engaging projection 23, which projects from the central portion of the base 22 in the lateral direction thereof toward the female track 24. The engaging projection 23, which substantially has a circular cross-section, extends over the whole base 22 in the longitudinal direction. The female track 24 has an elongated base 25, an elongated connection portion 27, which is integrally formed with the base 25 so as to project from the central portion of the base 25 in the lateral direction thereof toward the male track 21 and an elongated receiving portion 26, which is integrally formed with the longitudinally extending edge of the connection portion 27. The receiving portion 26 has an elongated groove 28 into which the engaging portion 23 of the male track 21 can detachably be inserted. The receiving portion 26, which substantially has an outer curved surface corresponding to a cylindrical shape in the cross section of the female track 24, extends over the whole base 25 in the longitudinal direction. The groove 28 of the receiving portion 26 also substantially has a circular cross-section.

Figure 4:
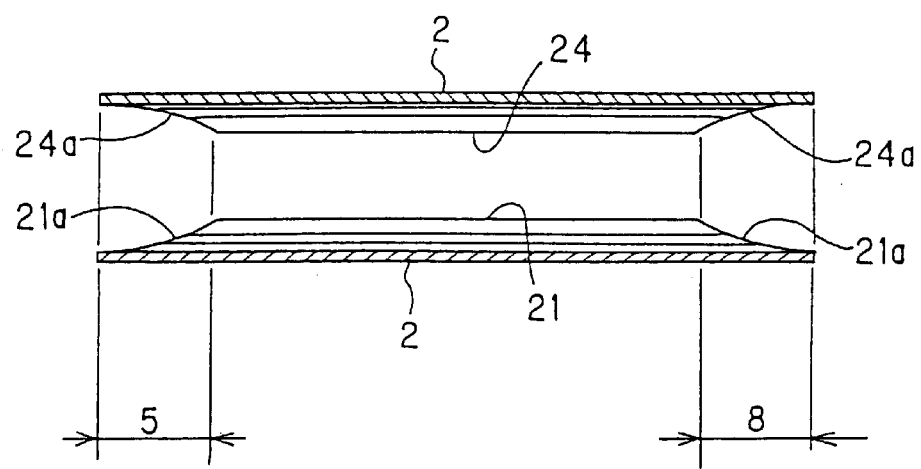
FIG. 4 is a plan view illustrating the zipper as shown in FIG. 3.

As shown in FIG. 4, the male track 21 is composed of a main portion and end portions 21a, 21a provided on the opposite ends of the main portion. The female track 24 is also composed of a main portion and end portions 24a, 24a provided on the opposite ends of the main portion. Each of the end portions 21a, 21a of the male track 21 has a smaller height than that of the main portion so as to be gradually smaller toward the opposite ends of the male track 21. Each of the end portions 24a, 24a of the female track 24 also has a smaller height than that of the main portion so as to be gradually smaller toward the opposite ends of the female track 24. A pair of end portions 21a, 24a of the male and female tracks 21, 24 is placed on the heat-sealed side edge 5 of the face members 2, 2 and the other pair of end portions 21a, 24a thereof is placed on the heat-sealed top edge 8 of the face members 2, 2. Decrease in height of the end portions 21a, 24a of the male and female tracks 21, 24 ensures the complete heat-sealing condition of the face members 2, 2 without causing defects in heat-sealing of such a position. In addition, gradual decrease in height of the end portions 21a, 24a of the male and female tracks 21, 24 prevents a gap from being formed between the heat-sealed side edge 5 and the heat-sealed top edge 8 of the face members 2, 2, on the one hand, and the opposite ends of the zipper 20, on the other hand, respectively.

The male track 21 and the female tack 24 are formed of thermoplastic resin on the inner surfaces of the face members 2, 2 by an injection molding in a manner as described later.

Description will be given below of a method for manufacturing the self-standable pouch 1.

Figure 5:
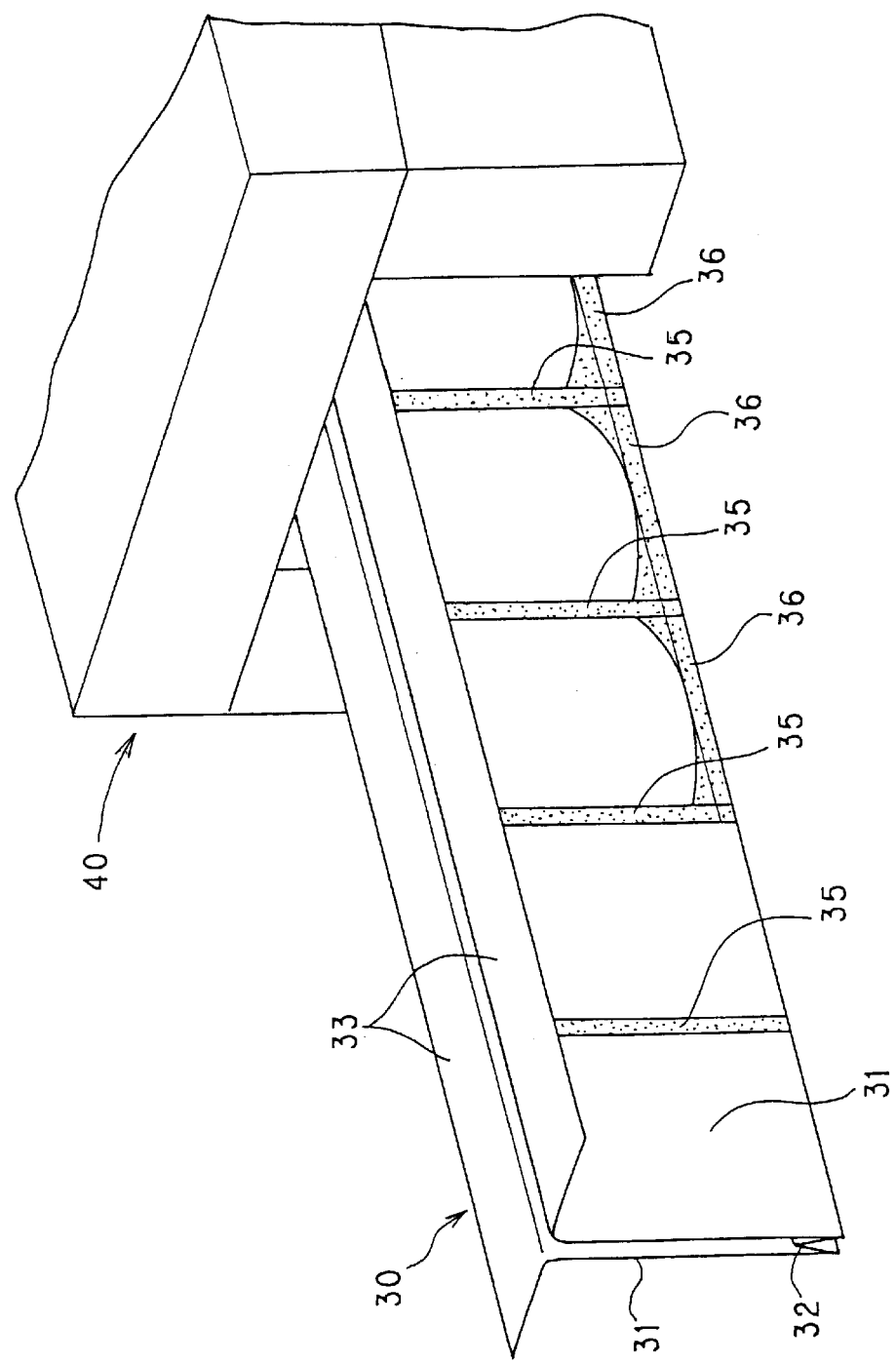
FIG. 5 is a perspective view illustrating an example of a heat-sealing step in a method for manufacturing the zippered bag as shown in FIG. 1.

As shown in FIG. 5, a strip of film 30 is subjected to the first folding step to form a folded bottom portion 32 placed in the central position thereof in the lateral direction so that the opposite edges of the strip of film 30, which extend in the longitudinal direction thereof, face each other and are placed above the folded bottom portion 32, while traveling the strip of film 30 in the longitudinal direction. The folded bottom portion 32 has a single pleat a convex side of which faces upward. Then, the second folding step is carried out to fold the upper portions of the strip of film 30 outward along reference lines, which respectively extend on the opposing faces of the strip of film 30 in parallel with the upper opposite edges thereof so as to be apart therefrom by a prescribed distance, to provide the first and second folded portions 33, 33 with their inner surfaces exposed.

Then, the first heat-sealing step is applied to the portion 31, 31 of the strip of film 30, which are located below the first and second folded portions 33, 33, in the vertical direction to form the vertical heat-sealed portion 35 having the prescribed width. After completion of the heat-sealing step, the strip of film 30 is traveled by a prescribed distance, and then the same heat-sealing step is carried out to form the other vertical heat-sealed portion. A plurality of vertical heat-sealed portions 35 is continuously formed in this manner by carrying out the first heat-sealing step. The adjacent two vertical sealed portions define the space for the single self-standable pouch 1 and also form the opposing side edges 5, 6. of the pouch 1. After completion of formation of the vertical sealed portions, the second heat-sealing step is applied to the folded bottom portion 32 and the corresponding lower portions 31, 31 of the strip of film 30 to form a horizontal heat-sealed portion 36, which is to form the bottom 3 of the pouch 1. The above-mentioned horizontal heat-sealed portion 36 has a curved portion a convex side of which face downward.

The first and second folding steps and the first and second heat-sealing steps as described above may be carried out simultaneously, while traveling the strip of film 30 in the longitudinal direction.

The strip of film 30 provided with the vertical heat-sealed portions 35 for forming the opposing side edges 5, 6 of the pouch 1 and the horizontal heat-sealed portions 36 for forming the bottom 3 thereof is transferred into an injection molding machine 40, as shown in FIG. 5. The injection molding machine 40 is to form the male and female tracks of the zipper 20 by which the mouth portion 10 of the self-standable pouch 1 can be opened or closed, on the inner surfaces of the first and second folded portions 33, 33 of the strip of film 30.

Figure 6:
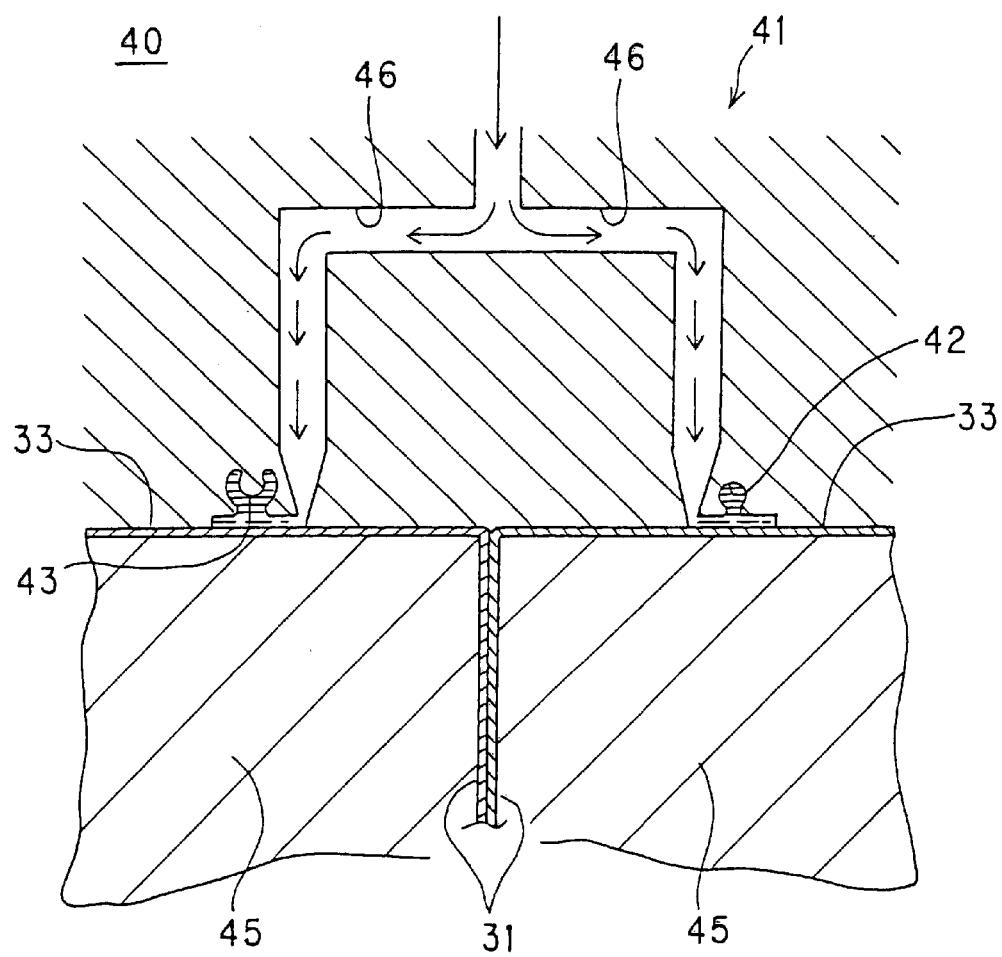
FIG. 6 is a cross-sectional view of an injection molding machine used to carry out an injection molding step for forming the zipper, which is provided in the zippered bag as shown in FIG. 1.

As shown in FIG. 6, the male track 21 and the female track 24 are formed on the inner surfaces of the first and second folded portions 33 of the strip of film 30, which is transferred into the injection molding machine 40. A mold 41 of the injection molding machine 40 has a male track forming section 42 for forming the male track 21 on the inner surface of the first folded portion 33 of the strip of film 30, on the one hand, and a female track forming section 43 for forming the female track 24 on the inner surface of the second folded portion 33 thereof, on the other hand. In addition, the injection molding machine 40 is provided with a pair of supporting tables 45, 45 for supporting horizontally the first and second folded portions 33, 33 thereon.

The male track forming section 42 and the female track forming section 43 communicate through passages 46, 46 with a cylinder (not shown), which is filled with molten resin having fluidity. Consequently, the molten resin flows into these forming sections 42, 43 through the passages 46, 46 from the cylinder. The resin supplied into the forming sections 42, 43 is cooled therein to solidify so as to form the male track 21 and the female track 24.

Figure 7:
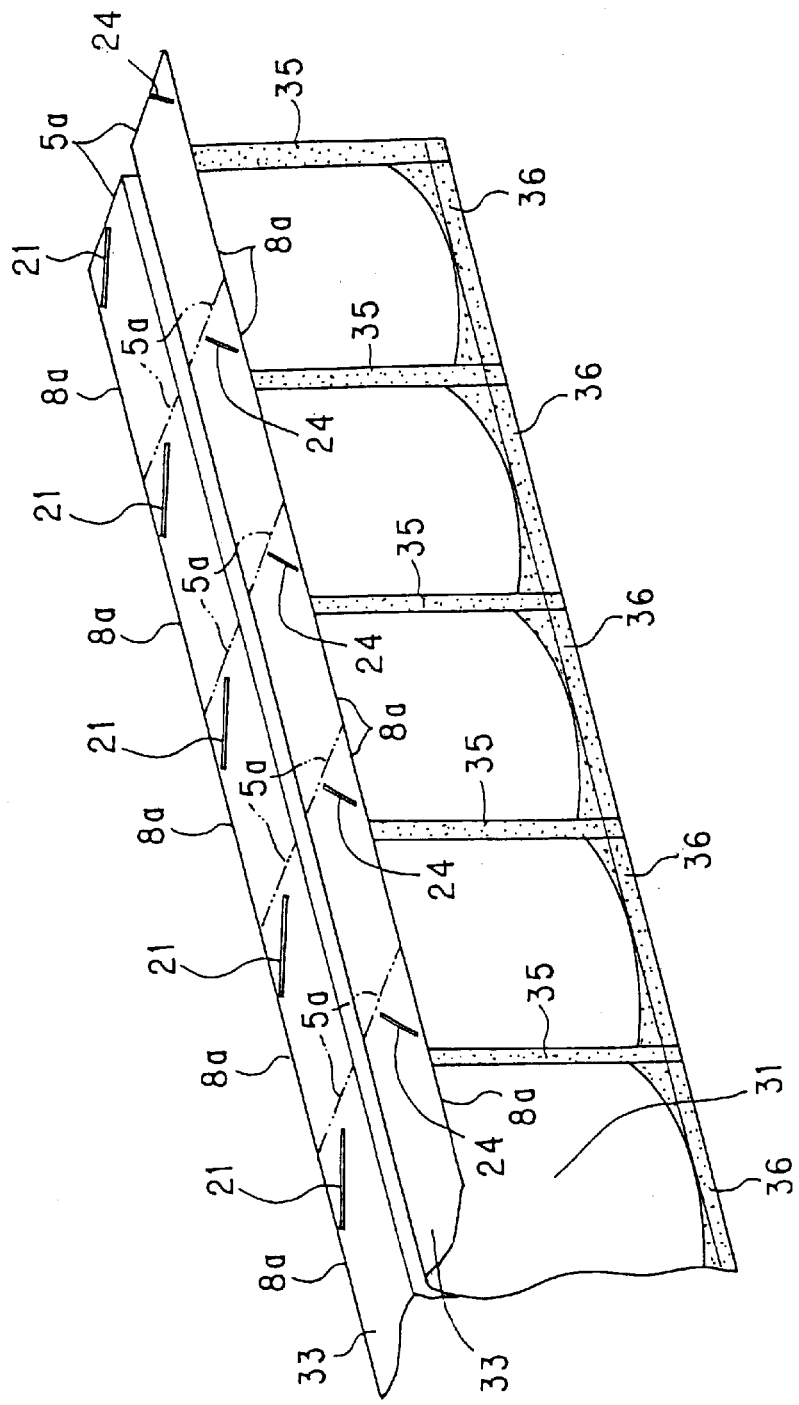
FIG. 7 is a perspective view illustrating a strip of film on which a plurality of sets of male and female tracks for the zipper has been formed through the injection molding step as shown in FIG. 6.

The male track 21 and the female track 24 are oblique relative to the longitudinal central line of the strip of film 30 so as to be symmetric with respect to the above-mentioned longitudinal central line, as shown in FIG. 7. More specifically, the male track 21 linearly extends from the edge of the first folded portion 33, which is to form the top edge 8 of the self-standable pouch 1, to a border line 5a of the strip of film 30, which is perpendicular to the traveling direction of the strip of film 30 and corresponds to the vertical heat-sealed portion 35. The female track 24 also linearly extends from the edge of the second folded portion 33, which is to form the top edge 8 of the self-standable pouch 1, to a border line 5a of the strip of film 30, which is perpendicular to the traveling direction of the strip of film 30 and corresponds to the vertical sealed portion 35. Then, the strip of film 30 is cut along the vertical central line of the respective vertical heat-sealed portions 35 into a plurality of semi-finished goods for the self-standable pouch 1.

Figure 8A:
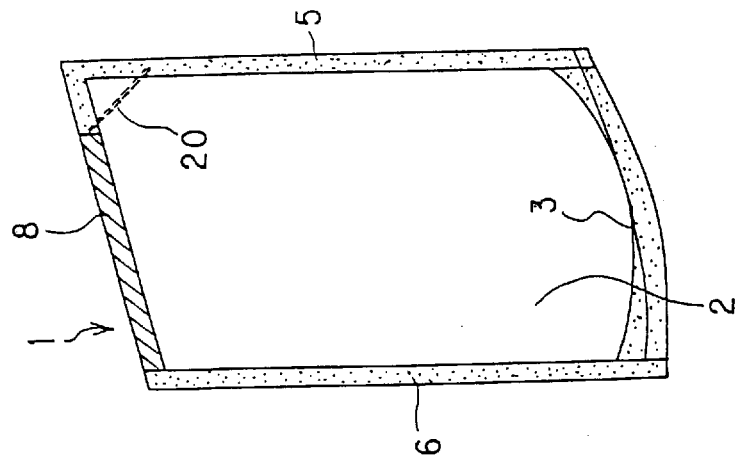
FIGS. 8(a), 8(b) and 8(c) are views illustrating the steps for heat-sealing the edges of the main bag body to complete formation of the zippered bag, after formation of the male and female tracks on the first and second folded portion with their inner surfaces exposed.
Figure 8B:
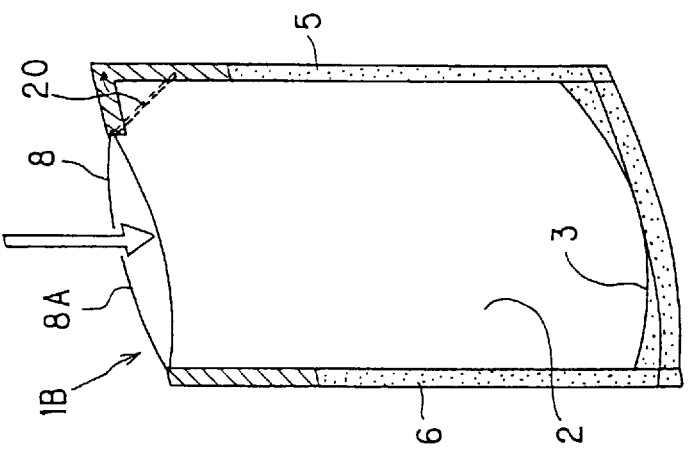
Figure 8C:
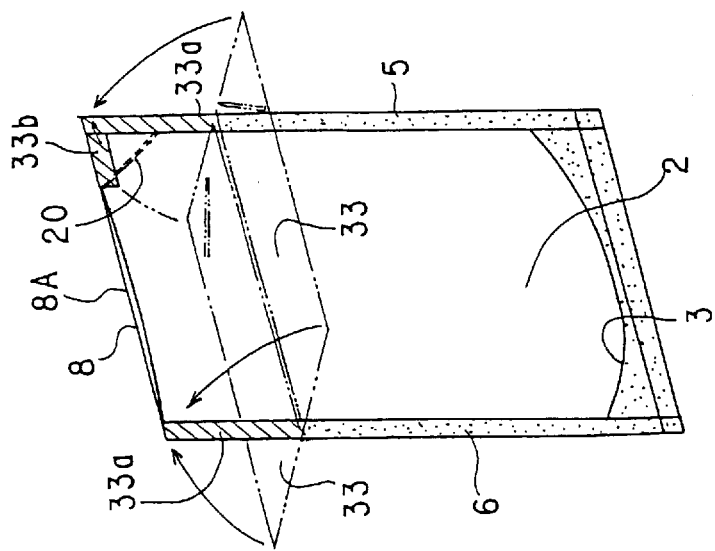

Then, the steps as shown in FIGS. 8(*a*) to 8(*c*) are carried out to complete manufacture of the self-standable pouch 1 filled with the contents.

More specifically, in the step as shown in FIG. 8(*a*), the first and second folded portions 33, 33 are unfolded upward to bring the opposing side edges of the first folded portion 33 into contact with the opposing side edges of the second folded portion 33 to convert the first and second folded portions into the first and second unfolded portions 33, 33 and engage the male track 21 with the female track 24 to keeping the zipper 20 in a closed state so as to be oblique relative to said opposing top edges, thus providing the upper and lower engaging points of the zipper 20. Then, the opposing side edges of the first unfolded portion 33 and the opposing side edges of the second unfolded portion 33 are heat-sealed to each other to form the first upper-side heat-sealed portion including the above-mentioned lower engaging point of the zipper 20 and the second upper-side heat-sealed portion. Then, the top edges of the first and second unfolded portions 33, 33 together in a region from the above-mentioned upper engaging point of the zipper 20 to the upper end of the first upper-side heat-sealed portion, thus forming a non-sealed opening portion 8A in a region from the above-mentioned upper engaging point of the zipper 20 to the upper end of the second upper-side heat-sealed portion. Then, the notches 11, 11 serving as the opening facilitation member are formed on the top edge 8 and the left-hand side edge 5 of the main bag body 1A so as to be located outside the zipper 20 in the vicinity thereof, as shown in FIG. 1. Then, the pouch 1 is filled with the powdery or granular contents through the non-sealed opening portion 8A as shown in FIG. 8(*b*). Then, the heat-sealing step is applied to the non-sealed opening portion 8A to close it to complete the manufacture of the self-standable pouch 1 filled with the contents as shown in FIG. 8(*c*).

Completion of the above-described steps forms the self-standable pouch 1 serving as the zippered bag as shown in FIGS. 1 and 2. The present invention is applied to the self-standable pouch 1 as described above, but applicable to a flat bag with a zipper.

The zippered bag as described above is a standard type, which is provided at the mouth portion of the bag with no other specific member than the zipper 20. Providing the bag in the sealed zone, which is placed on the outer side of the zipper 20, with opening guide portions 51, 51, 52, 52 as shown in FIGS. 9 and 10, makes it possible to improve the bag in its convenience.

Figure 9:
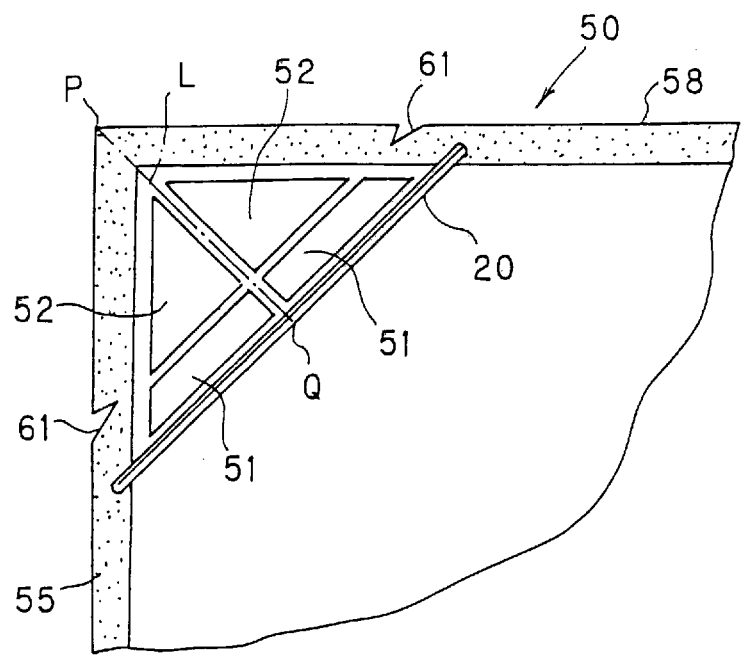
FIG. 9 is an enlarged front view illustrating a portion of the zippered bag provided with opening guide portions, the portion of which is to be torn open to form a mouth portion.

As shown in FIG. 9, there are formed in the sealed zone, which is placed on the outer side of the zipper 20, the opening guide portions 51, 51, 52, 52 which facilitate an tearing operation of the bag in parallel with the zipper 20. The opening guide portions are composed of a pair of trapezoidal sections 51, 51, which are placed in the above-mentioned sealed zone on the outer side of the zipper 20 and have the prescribed height, and a pair of triangular sections 52, 52, which are place outside the trapezoidal sections 51, 51. The trapezoidal sections 51, 51 and the triangular sections 52, 52 have a larger thickness than that of the film forming the opposing face members of the zippered bag 50. The trapezoidal sections 51, 51 are symmetric with respect to a line "L" connecting the corner "P" of the bag to the center "Q" of the zipper 20 in its longitudinal direction, and the triangular sections 52, 52 are also symmetric with respect to the same line "L". The trapezoidal sections 51, 51 and the triangular sections 52, 52 are spaced apart from each other by a prescribed distance.

A top edge 58 and a left-hand side edge 55 of the zippered bag 50 are provided with notches 61, 61, respectively, which are formed along the straight line passing through the gap between the trapezoidal section 51 and the triangular section 52. The notches 61, 61 serve as the opening facilitation member. More specifically, the sealed zone of the zippered bag 50 can easily be torn open along the gap between the trapezoidal sections 51, 51 and the triangular sections 52, 52, while being guided by means of these sections, so as to form the mouth portion 60.

Figure 10:
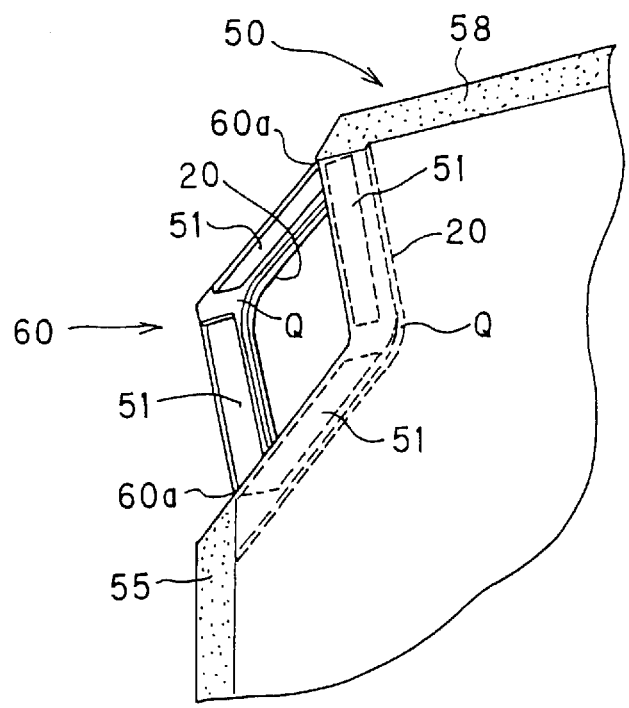
FIG. 10 is an enlarged perspective view illustrating the zippered bag as shown in FIG. 9, in which the portion of the zippered bag has been torn open to form the mouth portion as opened.

After the triangular sections 52, 52 are torn off and the mouth portion 60 is expanded to open, the trapezoidal sections 51, 51 serve as a reinforcement member for the mouth portion 60 of the zippered bag 50 as shown in FIG. 10. More specifically, the gap between the trapezoidal sections 51, 51 is formed so as to correspond to the center "Q" of the zipper 20, with the result that the central portion of the mouth portion 60 in the longitudinal direction has a relatively smaller rigidity. The mouth portion 60 can therefore be deformed easily at the central portion thereof. On the contrary, the other portions of the mouth portion 60 than the central portion thereof have larger rigidity than the central portion of the mouth portion 60, due to the trapezoidal sections 51, 51, so as to prevent easy deformation of the above-mentioned other portions of the mouth portion 60. The trapezoidal sections 51, 51 serve as a stretching member for the mouth portion 60. Pushing the opposite ends of the opened zipper 20 toward the center "Q" thereof to open the mouth portion 60 causes the mouth portion 60 to bend at the center "Q" of the zipper 20, with the result that the thus bent portions are expanded outward in the thickness direction of the zippered bag 50, while being guided by means of the trapezoidal sections 51, 51.

The existence of the trapezoidal sections 51, 51 makes it possible to form the mouth portion 60 as opened having a parallelogram or rectangular shape, four corners of which correspond to the opposite edges 60a, 60a of the mouth portion 60 and the central portions "Q" of the zipper 20. Any one of the above-mentioned four corners of the mouth portion 60 may serve as a pouring guide member, when the bag 50 with the zipper 20 opened is inclined and shaken lightly to hit softly the mouth portion 60 of the bag 50 against the rim of a vessel such as a cup, in order to pour out the contents. In case where the bag 50 is filled with the powdery or granular contents, it is possible to pour out successfully such contents into the vessel without splashing or spilling them around the vessel.

The above-described trapezoidal sections 51, 51 and the triangular sections 52, 52, which serve as the opening guide portions, are formed through the injection molding. When the male track 21 and the female track 24 of the zipper 20 are formed on the first and second folded portions 33, 33 through the injection molding as described above, these sections 51, 51, 52, 52 are also formed on the first and second folded portions 33, 33 of the strip of film 30 through the similar injection molding.

In the above-described embodiment of the present invention, the bag has the zipper in which the male and female tracks are formed through the injection molding. However, the present invention is not limited only to such an embodiment. In the present invention, it may be adopted a manufacturing method in which an elongated linear zipper that has previously been formed through an extrusion molding, is bonded to the strip of film to form the zippered bag, as shown in FIG. 11.

Figure 11:
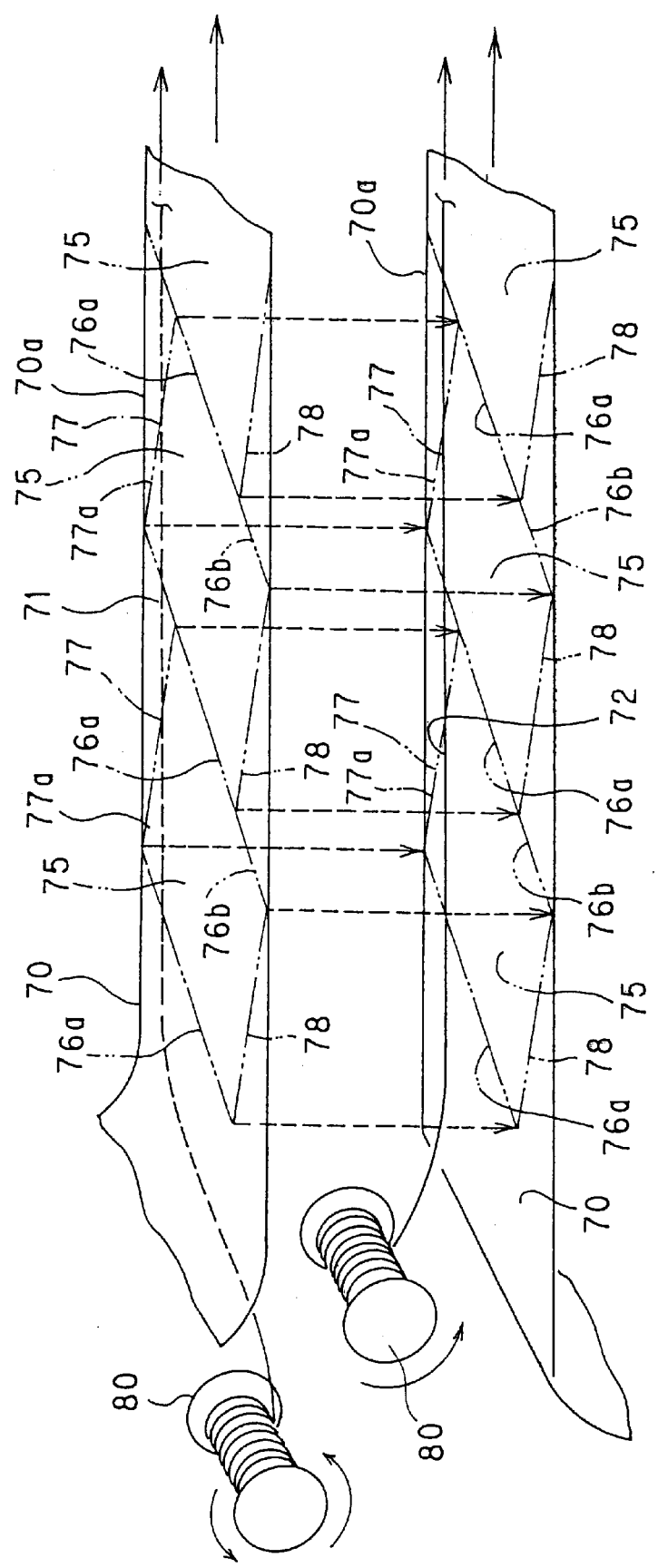
FIG. 11 is a descriptive view illustrating the other method for manufacturing the zippered bag of the present invention.

FIG. 11 shows the other embodiment of the present invention in which a method for manufacturing the zippered bag includes a step of feeding a strip of male track 71 and a strip of female track 72 on the inner surfaces of the first and second strips of film 70, 70, respectively to bond these tracks 71, 72 thereon, while traveling the first and second strips of film 70, 70 in their longitudinal direction. As shown in FIG. 11, the first and second strips of film 70, 70 are fed in the longitudinal direction so as to be in parallel with each other in a feeding zone, and the strip of male track 71 and the strip of the female track 72 are fed between the first and second strips of film 70, 70 so that these tracks 71, 72 are placed in prescribed positions of the inner surfaces of the first and second strips of film 70, 70, respectively. The strips of the male and female tracks 71, 72 are wound on reels 80, 80, respectively. These strips of male and female tracks 71, 72, which are supplied from the reels 80, 80, respectively, are bonded on the opposing inner surfaces of the first and second strips of film 70, 70 in the respective positions, so as to be in parallel with the respective one side edges 70a, 70a of the first and second strips of film 70, 70 in the vicinity thereof.

After completion of the step of bonding the strips of male and female tracks 71, 72 on the first and second strips of film 70, 70 to prepare the first film-material strip with the strip of male track 71 and the second film-material strip with the strip of female track 72, the first film-material strip 70 with the strip of male track 71 is placed on the second film-material strip 70 with the strip of female track 72 as shown in FIG. 11 in arrows with dotted lines. Prior to such a placing step, a precise positional adjustment of these strips 70, 70 is made so that the male track 71 of the former strip 70 engages with the female track 72 of the latter strip 70.

Figure 12:
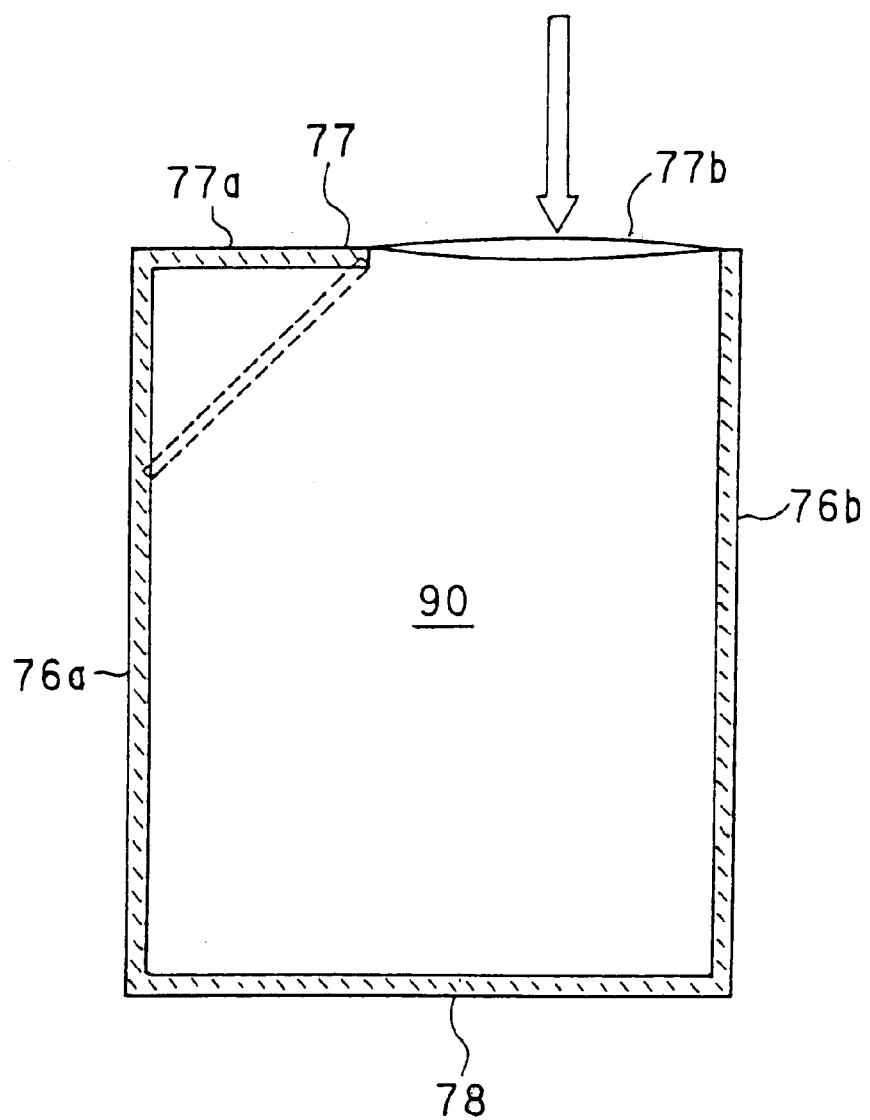
FIG. 12 is a front view of the zippered bag as manufactured in accordance with the method as shown in FIG. 11.

Then, there is carried out a step for determining areas, each of which has a top, a bottom and opposing sides, of the film-material strips 70, 70 to which the subsequent heat-sealing step is to be applied, so that the male and female tracks 71, 72 engaging with each other linearly extend from the top 77 of the above-mentioned area to one 76a of the opposing sides thereof so as to be oblique relative to the top 77 of the above-mentioned area. More specifically, the above-mentioned step for determining the areas is carried out by inclining the reference line parallel with the opposing sides 76a of the above-mentioned area of the film-material strips 70, 70 relative to the side edges 70a, 70a thereof, i.e., the traveling direction thereof by a prescribed angle as shown in FIG. 11 in two-dot chain lines. Then, the thus determined areas of the film-material strips 70, 70 are subjected to the heat-sealing step to heat-seal the opposing sides 76a, 76b, the bottom 78 and a part 77a of the top 77 for each of the above-mentioned areas as determined so that the areas thus heat-sealed are arranged obliquely in the traveling direction of the film-material strips 70, 70. Then, the film-material strips 70, 70 are cut into a plurality of zippered bags 90, each of which has a non-sealed opening portion 77b formed at the top 77 as shown in FIG. 12. The zippered bag 90 is to be filled with the contents through the non-sealed opening portion 77b. Then, the non-sealed opening portion 77b is to be heat-sealed, thus completing manufacture of the zippered bag filled with the contents.

In the above-described embodiment, the method of the present invention is applied to manufacture of the flat zippered bag. However, the method of the present invention may be applied to manufacture of the self-standable zippered bag utilizing the linear zipper, which has previously been formed through the extrusion molding.

According to the present invention as described in detail, it is possible to manufacture the zippered bag, which permits to pour easily the contents received therein, without splashing or spilling them around the bag. The present invention provides more remarkable effects in case where the bag is filled with the powdery or granular contents.

In addition, the full length of the zipper can be decreased in comparison with the conventional bag. It is therefore possible to reduce the probability of occurrence of clogging of the zipper. Even if the clogging of the zipper occurs, the material with which the zipper is clogged can easily be removed therefrom.

The entire disclosure of Japanese Patent Application No. 2001-221935 filed on Jul. 23, 2001 including the specification, claims, drawings and summary is incorporated herein by reference in its entirety.

What is claimed is:

1. A zippered bag comprising:

a main bag body having first and second opposing face members, a top, a bottom, and first and second opposing sides; and a zipper located for opening and closing an aperture comprising a pair of substantially parallel edges in said main bag body, wherein:

said zipper having a length extending from one of said top and said bottom to one of said first and second opposing sides obliquely relative to said one of said top and said bottom, and said main bag body has a sealed zone that is located on an outer side of said zipper, said sealed zone having guide portions that have a greater rigidity than said main bag body, said guide portions comprising a first pair of guide portions located on an inner surface of the first face member adjacent the edges of said aperture and a second pair of guide portions located on an inner surface of the second face member adjacent edges of said aperture and facing said first pair of guide portions, each pair of guide portions being spaced apart from each other.

2. The zippered bag of claim 1, wherein:

said zipper comprises a male track and a female track engageable therewith.

3. The zippered bag of claim 2, wherein:

said male track and said female track are injection molded tracks each respectively located on inner surfaces of said first and second opposing face members.

4. The zippered bag of claim 2, wherein:

each of said male track and said female track comprises a main portion and end portions located on opposite ends of said main portion along the length of the zipper, each of said end portions having a smaller height than a height of said main portion.

5. The zippered bag as claimed in claim 3, wherein:

each of said male track and said female track comprises a main portion and end portions located on opposite ends of said main portion along the length of the zipper, each of said end portions having a smaller height than a height of said main portion.

* * * * *